United States Patent [19]

Bilanin

[11] Patent Number: 4,682,808

[45] Date of Patent: Jul. 28, 1987

[54] VEHICLE DRAG REDUCER

[76] Inventor: Alan J. Bilanin, 62 Battle Rd., Princeton, N.J. 08540

[21] Appl. No.: 758,405

[22] Filed: Jul. 24, 1985

[51] Int. Cl.$^4$ .......................................... B62D 35/00
[52] U.S. Cl. ........................................ 296/1 S; 296/91
[58] Field of Search .................. 296/1 S, 91; 105/2 R

[56] References Cited

U.S. PATENT DOCUMENTS

| | | | |
|---|---|---|---|
| 1,923,349 | 8/1933 | Wolverton | 296/1 S |
| 2,146,297 | 2/1939 | Huet | 105/2 R X |
| 2,569,983 | 10/1951 | Favre | 296/1 S X |
| 3,010,754 | 11/1961 | Shumaker | 296/1 S |
| 3,741,285 | 6/1973 | Kusthe | 168/1 |
| 3,776,363 | 12/1973 | Kuethe | 181/33 C |
| 3,971,586 | 7/1976 | Saunders | 296/91 X |
| 3,999,797 | 12/1976 | Kirsch et al. | 296/1 S |
| 4,068,883 | 1/1978 | Meineche et al. | 296/91 X |
| 4,195,874 | 1/1980 | Janssen et al. | 296/1 S |
| 4,214,787 | 7/1980 | Chain | 296/1 S |
| 4,257,640 | 3/1981 | Wiley | 105/2 R X |
| 4,257,641 | 3/1981 | Keedy | 296/1 S |
| 4,443,865 | 2/1984 | Crompton, Jr. | 296/91 X |
| 4,451,074 | 5/1984 | Scanlon | 296/1 S |
| 4,508,380 | 4/1985 | Sankrithi | 296/1 S |

FOREIGN PATENT DOCUMENTS

| | | | |
|---|---|---|---|
| 1079772 | 6/1980 | Canada | 296/1 S |
| 556883 | 7/1923 | France | 296/9 |
| 2366979 | 5/1978 | France | 296/1 S |
| 150582 | 9/1981 | German Democratic Rep. | 296/1 S |
| 200323 | 4/1983 | German Democratic Rep. | 296/1 S |

OTHER PUBLICATIONS

*Effect of Rear-Mounted Disc on Drag of Blunt Body;* W. A. Mair; The Aeronautics Quarterly; Nov. 1965.
*Effect of Low Flow Rate of Gas on After Body Pressure Distribution;* D. M. Sykes; The City University, London, 1969.
*Mechanisms of Two and Three-Dimensional Base Drag;* D. J. Maull; 1978 Symposium General Motors.
*Drag Related Flow of Trucks and Buses;* Mason, Jr. and Beebee; 1976 General Motors Symposium.
*The Truck of the Future;* J. Zygmont; High Technology; Jun. 1985.
*Reduction of Base Drag;* M. Tanner; Aerospace Science; 1975, vol. 16, No. 4, pp. 369-384.
*Truck Aerodynamics;* H. Flynn and P. Kyropoulos; General Motors Corp; Aug., 1975.
*Headwind;* D. Ritchie; Commercial Car Journal; Sep. 1973.

Primary Examiner—Robert B. Reeves
Assistant Examiner—Russell D. Stormer
Attorney, Agent, or Firm—Richard C. Woodbridge

[57] ABSTRACT

A drag reducing apparatus is attached to the back of a vehicle and serves to reduce drag by capturing at least two vortices which turn the flow inwardly behind the vehicle body thereby effectively reducing the back area of the vehicle. The first and second vortices are captured in cavities formed by a first and a second vertical panel attached to the back of a vehicle. A third horizontal panel can be attached to the top of the first and second panels to create a cavity for the capture of a third vortex formed by the air stream flowing over the top of the vehicle. The panels are preferably hinged so that they can be folded up flat against the rear of the vehicle when not in use. When in use the panels are locked in position so that they don't vibrate when the vehicle is moving. Top and bottom panels can be employed to define the upper and lower limits of the first and second vortex. Other embodiments employ different panel arrangements to improve the efficiency of the vortex capture.

16 Claims, 24 Drawing Figures

VEHICLE DRAG REDUCER

BACKGROUND OF THE INVENTION

1. Field of the Invention

The invention comprises an apparatus attached to the back of a vehicle for reducing the fluid drag thereon by creating at least two vortices which turn the flow inwardly after it passes the sides of the body.

2. Description of the Prior Art

A number of efforts have been made to reduce the aerodynamic drag on blunt bodies such as semi-trailers and trailer vans. In general vans have a blunt rear end in order to improve ease of fabrication of rear loading doors and also so that the trailer can butt directly against loading docks. Blunt ended moving bodies have high drag as a consequence of relatively lower pressures acting on the rear base of the vehicle. The base pressure results in base drag and the reduction of this drag has received some attention by previous investigators and inventors. Boat tailing, which involves adding a tapered extension backward from the blunt base, has long been known to reduce base drag. However, those devices are bulky and must be removed to permit loading of the truck. U.S. Pat. No. 4,257,641 entitled VEHICLE DRAG REDUCER discloses a boat tail which replaces the conventional system of doors. Similarly, U.S. Pat. No. 4,451,074 describes a collapsible boat tailing airfoil in which the airfoils can be folded away from the base and against the side of the trailer when the vehicle is backed into a loading dock. Unfortunately boat tails are relatively large structures and require the substantial deployment of hardware. As a compromise the boat tail may be reduced in size by not tapering the end to a point such as described in U.S. Pat. No. 4,214,787 entitled DRAG REDUCING APPARATUS. Such a device could be referred to as a partial boat tail. Alternatively, Freuhauf produced an experimental FEV 2000 tractor semi-van trailer vehicle which was built in 1981. An interesting description of the FEV 2000 vehicle is found in an article entitled "The Truck of the Future" which appeared in the June 1985 edition of High Technology Magazine on pages 28 through 33. However, base drag reduction using partial boat tailing is not as great as that achieved when using full boat tailing. This performance degradation may be somewhat offset by using a vortex generator on the partial boat tail such as described in U.S. Pat. Nos. 3,741,285 and 3,776,363. Other devices described in the patent literature but not believed to be as relevant to the present invention are described in U.S. Pat. Nos. 2,514,695; 3,934,923; 3,960,402; 3,971,586; 3,999,797; 4,113,299; 4,316,360 and 4,451,074.

Another approach to reducing base drag is to bleed air into the base area. Studies undertaken by Sykes, in the 1969 Proceedings of the First Symposium on Road Vehicle Aerodynamics at the City University in London, have shown that significant reductions in base drag can be achieved. Unfortunately, when estimates are made of the power required to supply the air to the base region, the concept becomes impractical and uneconomical.

Another alternative method to reduce base drag was proposed by W. T. Mason, Jr. and P. S. Beebee, in the Proceedings of the Symposium on Aerodynamic Drag Mechanisms of Bluff Bodies and Road Vehicles, sponsored by General Motors Research Laboratories on Sept. 27-28, 1976. The concept was to install a single splitter plate either vertically or horizontally extending perpendicular off the rear base of the truck. The purpose of the plate was to allow the flow separating from the side of the truck to reattach to the vertical plate or the flow separating from the roof and the bottom of the truck to reattach to the horizontal plate. Unfortunately, very little reduction in base drag was achieved with that concept.

Figure 1A:
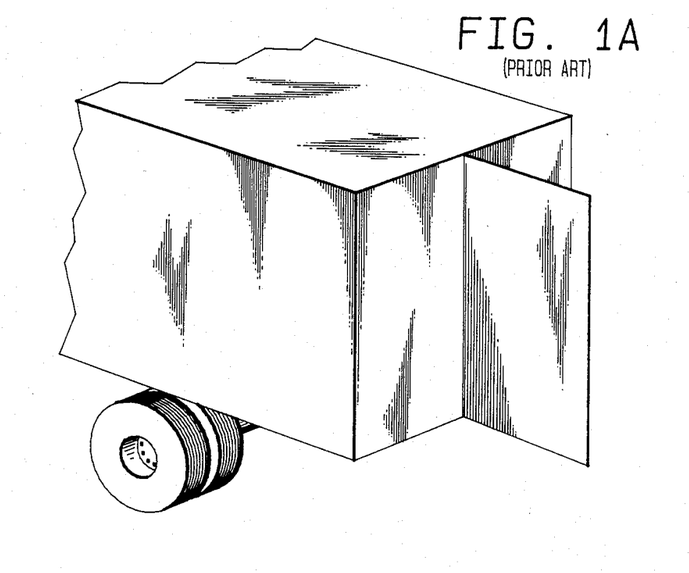
FIG. 1A is a prior art embodiment employing a single vertical splitter.
Figure 1B:
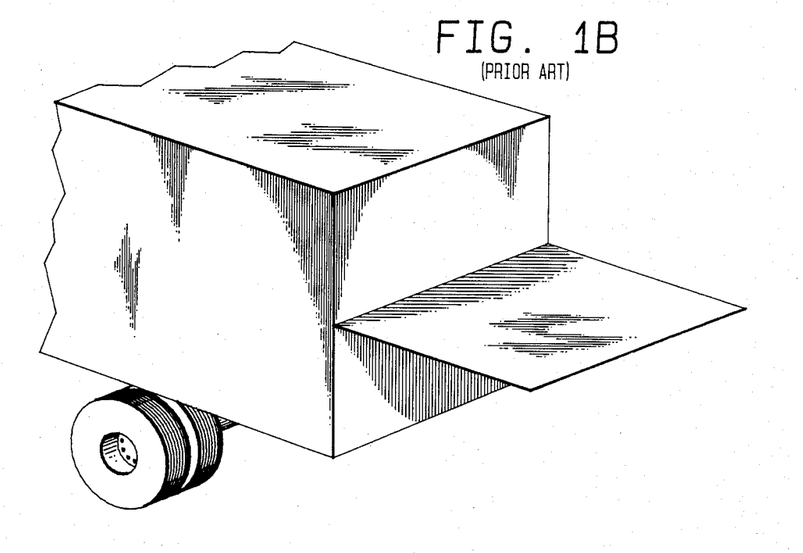
FIG. 1B is a prior art embodiment employing a single horizontal splitter.
Figure 1C:
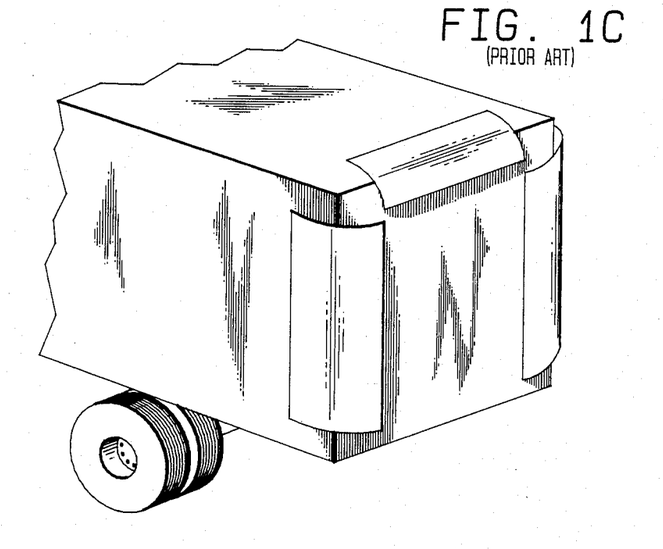
FIG. 1C is a prior art embodiment employing three turning vanes.
Figure 1D:
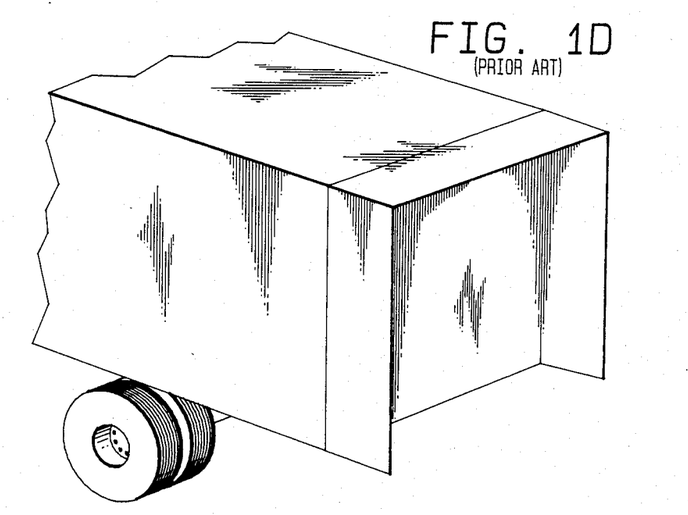
FIG. 1D is a prior art embodiment in which a single large cavity is formed at the rear of the semitrailer.

Four of the embodiments studied by Mason and Beebee are illustrated in FIGS. 1A through 1D and labeled as "Prior Art." FIG. 1A illustrates a single vertical splitter. Unfortunately, to be effective a single vertical splitter has to extend an unreasonably long distance behind a van. Moreover, the inherent instability of the vortices created on both sides of the single splitter causes the resultant drag reduction to be relatively poor. FIG. 1B is similar to FIG. 1A except that the single splitter is located in the horizontal plane. This technique was also believed to be ineffective due to the extreme length of the single splitter and the turbulence generated beneath the truck carriage. FIG. 1C illustrates another prior art technique in which turning vanes are used to turn the airflow around the sides inwardly thereby reducing the effective base drag area of the van. FIG. 1D illustrates another prior art technique examined by Maso and Beebee in which a dead air space cavity was effectively formed behind the end of a semi-trailer van by extending the plane on the side and top surfaces of the vehicle. In general the results obtained by the prior art techniques 1A through 1D were disappointing, especially when viewed in light of the results obtained by the present invention.

The splitter plate concept has been shown to be effective in reducing the base drag of two-dimensional bodies such as the blunt trailing edge of an airplane wing. See for example, M. Tanner, Progress in Aerospace Science, Vol. 16, No. 4, pp. 369-384, Pergamon Press, 1975. Apparently the flow behind a truck is more complicated than a flow behind a simple two-dimensional body. Another approach using plates to reduce base drag is to attach plates so that they are flush to either the sides or the roof or the floor of a vehicle and then extended backwards. In an experiment reported by D. J. Maull, in the Proceedings of the Symposium on Aerodynamic Drag Mechanisms of Bluff Bodies and Road Vehicles, sponsored by General Motors Reseach Laboratories in 1978, such plates provided relatively modest but not sufficient reduction in base drag to be economically viable.

Figure 1E:
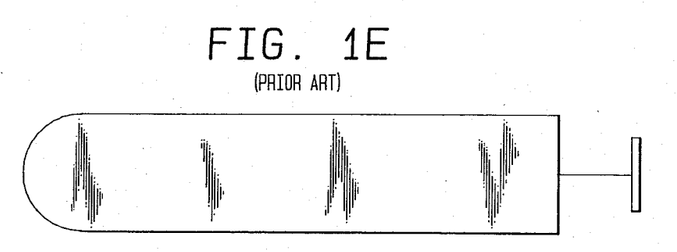
FIG. 1E is a side view of a prior art embodiment for capturing a vortex behind a blunt-based body of revolution.
Figure 1F:
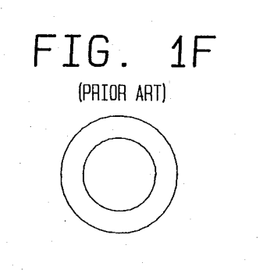
FIG. 1F is an end view of the prior art embodiment of FIG. 1E.
Figure 1G:
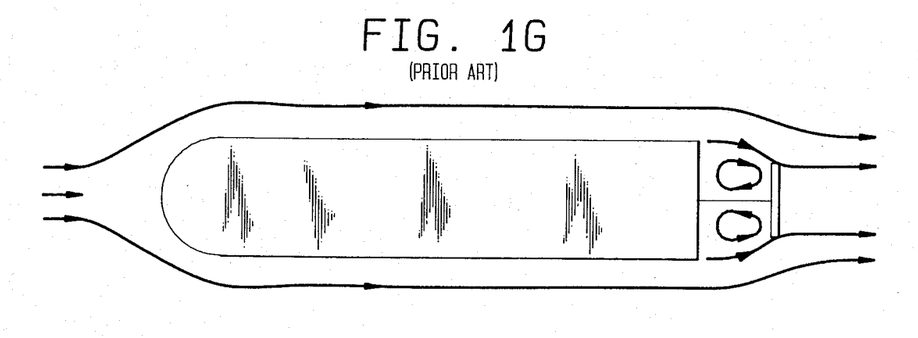
FIG. 1G is a schematic view of the prior art embodiment of FIG. 1E showing the manner in which captive vortex eddy rings are believed to be contained between the rear of the body of revolution and a trailing disc.

An article entitled The Effect of a Rear-Mounted Disc on the Drag of a Blunt-Based Body of Revolution, by W. A. Mair, and published in The Aeronautical Quarterly, Nov. 1965 has shown that a disc of revolution mounted on a base of revolution can reduce base drag substantially. Such a device is shown in FIGS. 1E, 1F and 1G and is labeled "Prior Art". The reduction in drag is believed to be the result of a vortex ring eddy trapped between the base of the body and the disc as shown in FIG. 1G. The vortex ring is believed to help turn the flow inward downstream of the base and, hence, reduce the effective base area of the body of revolution. Unfortunately, a simple rectangular plate cannot be attached to the base of a truck with similar success, since the axis of a vortex ring cannot be bent to a rectangular configuration to conform to the space between the base and the rectangular plate. The Mair concept does, however, describe the use of trapped vortices to reduce the base drag of vehicles.

The disappointing results of the prior art suggest that no one, to date, has successfully trapped a vortex behind a body similar to a semi-trailer or trailer van. The present invention appears to have been successful in efficiently trapping a vortices and obtaining drag reduction in the neighborhood of 10.2%. This has resulted in substantial drag reduction all of which could have a significant impact on the cost of trucking and our quality of life. In the United States semi-trailer vans expend over 10 billion gallons of diesel fuel per year. A needless waste of fuel increases dependency on imported oil, as well as adding needless diesel exhaust carcinogens into the atmosphere. It had previously been difficult to reduce the drag on blunt bodies by trailing devices given federal and state regulations. However, recently the United States Congress has enacted legislation which permits trailer/semi-trailer length limits to be exceeded if the purpose is to improve fuel efficiency. It appears that the present invention can reduce the aerodynamic drag of a semi-trailer or trailer van in excess of 10%. This could result in a nationwide yearly savings of diesel fuel in excess of 1 billion gallons.

SUMMARY OF THE INVENTION

Briefly described the invention comprises a device attached to the back end of a vehicle for capturing two drag reducing vortices. The vehicle could be any vehicle that has a relatively blunt back end including but not limited to trailer and semi-trailer vans, buses and trucks. According to the simplest embodiment, the invention comprises a vertical panel and a horizontal panel which form two cavities for capturing two vortices. The horizontal panel may be on top of or below the vertical panel and the vertical panel is located half way between the left and right sidewalls of the vehicle. The preferred embodiment comprises two vertical panels which form cavities for respectively capturing the first and second vortices. A third panel which is horizontal with respect to the top surface of the vehicle and perpendicular with respect to the first and second panels, serves to define a third cavity to capture a third vortex having an axis of rotation perpendicular to the axis of rotation of the first and second captured vortices. Additional panels can be added to further improve the efficiency of the vortex capturing scheme just described. The invention is preferrably employed in the context of a semi-trailer or trailer van having a height H and a width W. According to the preferred embodiment the vertical panel or panels are located a distance D from the edge of either sidewall such that the ratio D/W is less than ½. According to alternative embodiments of the invention additional paneling may be added to further stabilize and define the capture of the vortices. These and other features of the invention will be more fully understood by reference to the following drawings.

DETAILED DESCRIPTION OF THE PREFERRED EMBODIMENT

During the course of this description like numbers will he used to identify like elements according to the different figures which describe the invention.

In general the invention comprises an apparatus for reducing the base drag behind bluntly ended or truncated vehicles by affixing two or more panels to the base of the vehicle. The vehicle could be any vehicle having a relatively blunt back end including trailer and semi-trailer vans, buses, minivans, minibuses, recreational vehicles, trucks, etc. The panels permit trapped or captured eddys to be stabilized and generated. The stabilized vortices turn the flow along the roof, sides and bottom of the vehicle inwardly towards the center line of the rear of the vehicle. The vortices aerodynamically close the base flow after the vehicle so that the flow field is similar to that about a boat tail. The base pressure is raised by the pressure recovery which occurs as the result of turning the flow inward toward the center line of the base.

Figure 2A:
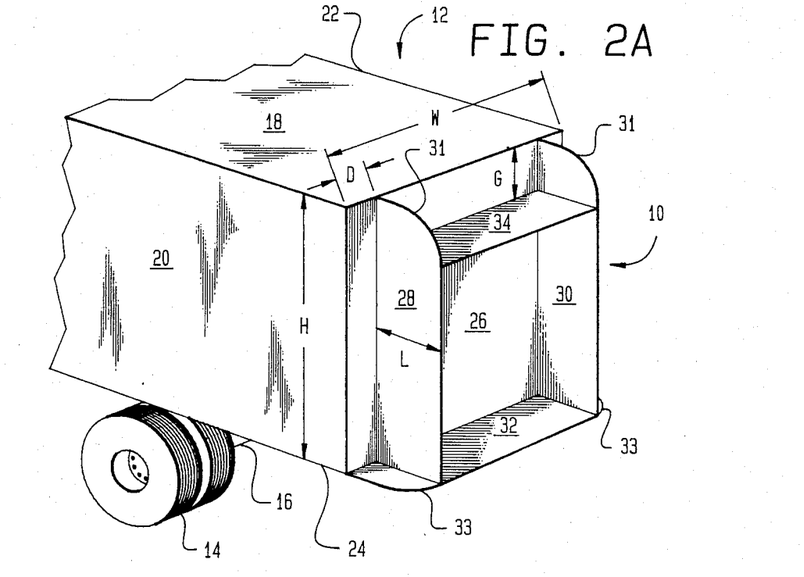
FIG. 2A is a perspective view of the preferred embodiment of the present invention.

The preferred embodiment 10 of the present invention is illustrated in the perspective view of FIG. 2A. The drag reducing invention 10 is attached to the rear 26 of a conventional van 12. The front end of the van 12 is not illustrated since it is conventional and forms no part of the invention. The van 12 however could be the rear end of a van, the rear end of a trailer or semi-trailer, the rear end of a bus, or the rear end of a standard truck. Those vehicles all share the common characteristic of being blunt bodies having a relatively flat trailing rear section 26. The trailing section of the van 12 is supported by wheels 14 connected by a standard axle 16. The presence of wheels 14 and axle 16 tends to increase the turbulence generated underneath the van which is generally more severe than the turbulence coming from the sides and top of the van.

Each prior art van includes the following conventional points of reference: a top side 18; a left side 20; a right side 22; a bottom side 24 and, as previously discussed, a rear section 26. The rear section may include two flat hinged swing rear doors 56 such as illustrated in FIG. 2G or may include a roll-up rear door arrangement 68 such as illustrated in FIG. 2I.

As shown in FIG. 2A, two vertical panels are attached to the rear 26 of van 12 a distance D away from the left side 20 and the right side 22. A bottom panel 32 extends the plane of the bottom portion 24 of the van 12 rearwardly by distance L. Similarly a top panel 34 located a distance G from the top 18 of the van 12 extends rearwardly by the same distance L and spans the space between the two vertical panels 28 and 30. Accordingly, the length of top panel 34 is the width W of the top surface 18 minus twice the offset D of vertical panels 28 and 30, i.e. length of panel 34=W−2D. Vertical panels 28 and 30 have a height H equal to the height of the sides of the van 20 and 22 and both panels extend rearwardly by the distance of L so that all panels 28, 30, 32 and 34 all extend rearwardly by the same distance L. While the preferred embodiment has panels that all extend backward by the same distance, it would also be possible to operate with panels of different rearward extensions L. The top portions 31 of vertical panels 28 and 30 are curved downwardly whereas the bottom portions of panels 28 and 30 are cut off square with respect to the surface of bottom panel 32.

Vertical panels 28 and 30 along with bottom panel 32 and the van base 26 form two, three-sided cavities 36 and 38 respectively which permit a first vortex 44 and a second vortex 46 to be stabilized or trapped inside of those cavities. The nature of the vortex capturing mechanism is best understood by referring to FIGS. 2B and 2C. Side vortex cavities 36 and 38 formed by panels 28, 30 and 32 and van base 26 have a high aspect ratio. This means that D/H and L/H are less than unity in order to trap a stable vortex. A D/H less than unity permits the flow from the sides of the van to reattach to either vertical panel 28 or 30. The bottom panel 32 which forms one end of cavities 36 and 38 significantly improves the stability of the captured vortices 44 and 46. In the preferred embodiment, a top panel 34 is used to create a top horizontal vortex capturing cavity 40 which will trap a top vortex 48 and turn the airflow coming off the roof 18 downward towards the center line of the van base 26 further raising the base pressure.

Figure 2B:
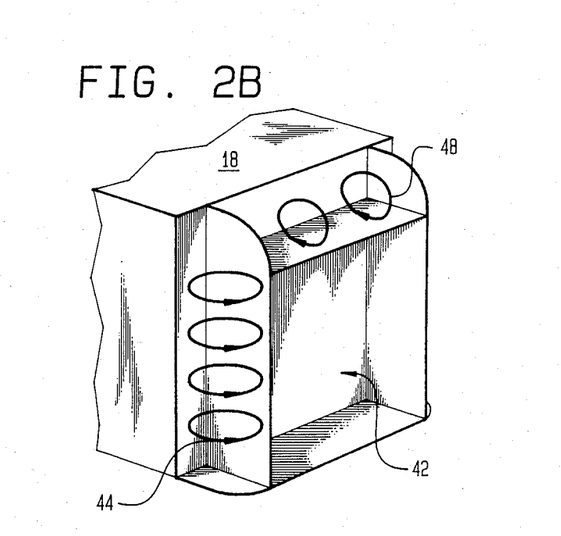
FIG. 2B is a detail perspective view of the preferred embodiment of FIG. 2A showing the manner in which vortices are captured in order to assist in drag reduction.
Figure 2C:
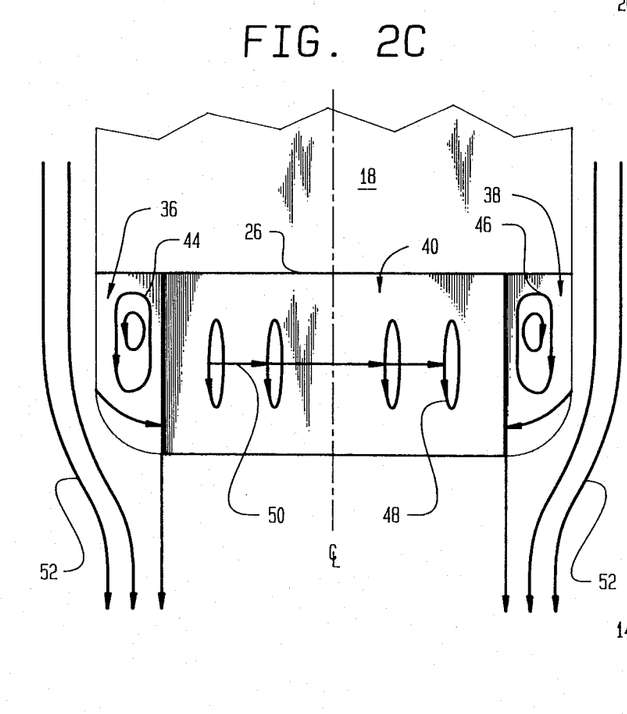
FIG. 2C is a top plan view of the preferred embodiment of FIG. 2A showing the manner in which the vortices are captured.

FIG. 2B illustrates the trapping of the left side vortex 44 and the top vortex 48. The vortices 44, 46 and 48 turn the air 52 leaving the sides 20 and 22 and the roof 18 of the van towards the center of the van base 26 thereby raising the base pressure and reducing the drag. A dead arera space 42 is formed by the box-like area framed by panels 28, 30, 32 and 34 and the van base 26. FIG. 2C is a top plan view of the preferred embodiment showing the trapped vertical vortices 44 and 46 turning the flow 52 from the sides of the van inward towards the center line of the van back 26. Also shown is the rotational axis 50 of the top vortex 48 which takes the flow 52 leaving the roof 18 and directs the flow 52 downward, thereby further reducing the effective van base area.

Figure 2D:
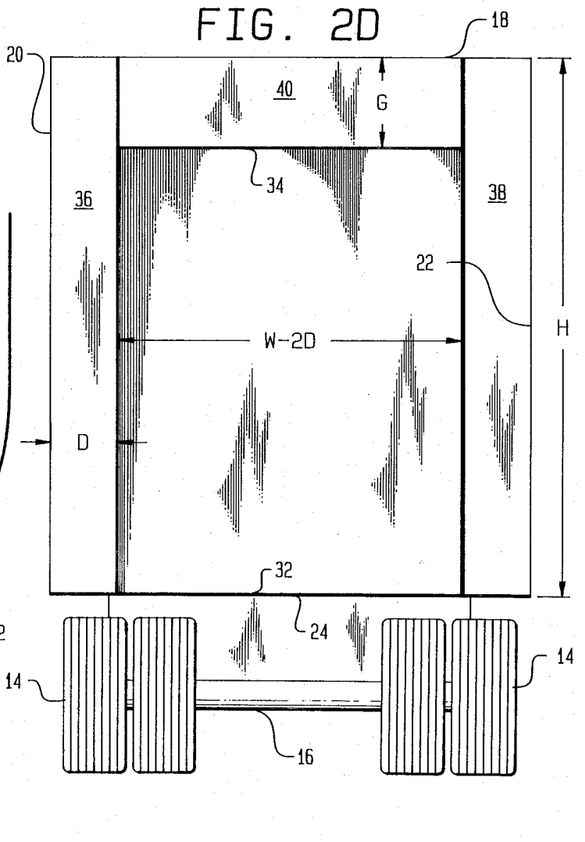
FIG. 2D is a rear elevational view of the preferred embodiment of FIG. 2A.

A rear elevational view of the preferred embodiment 10 is shown in FIG. 2D where the horizontal top panel 34 is shown as located a dimension G from the top 18 of the van 12. In order to capture a stable vortex in the cavity 40 formed by vertical panels 28 and 30 and horizontal panel 34 and van base 26, the dimension G must be a fraction of the rearward extension of the panel L. The capture efficiency of the horizontal vortex 48 also improves when G/W−2D is much less than 1. The base panel 32 is shown mounted horizontally flush with the bottom 24 of the van 12 in order to shield the vortex capturing panels 28, 30, and 34 from the dirty flow field under the van 12 associated with the flow around and over the wheels 14 and axles 16. The base panel 32 is preferably not moved vertically above the elevation of the van floor 24 to form a cavity similar to that formed by top panel 34, since, for the most part, the air stream 52 under the van 12 is pulled along with the undercarriage. It would, therefore, be difficult to capture a vortex of any appreciable strength which would turn the flow from under the van 12 upward at the van base.

Figure 2E:
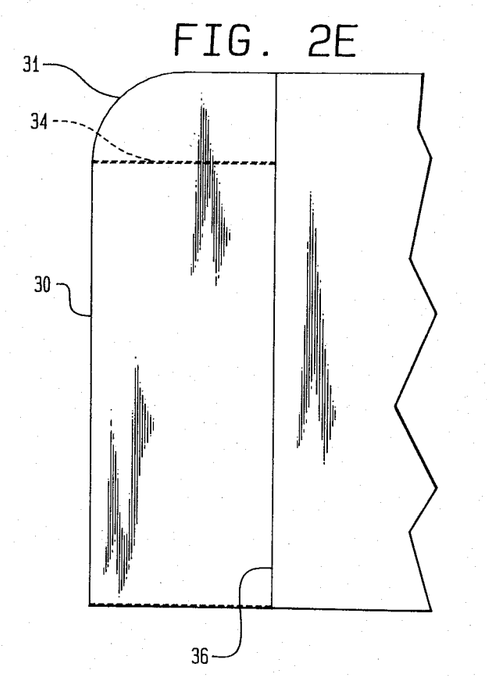
FIG. 2E is a partial right side elevational view of the preferred embodiment of FIG. 2A.
Figure 2F:
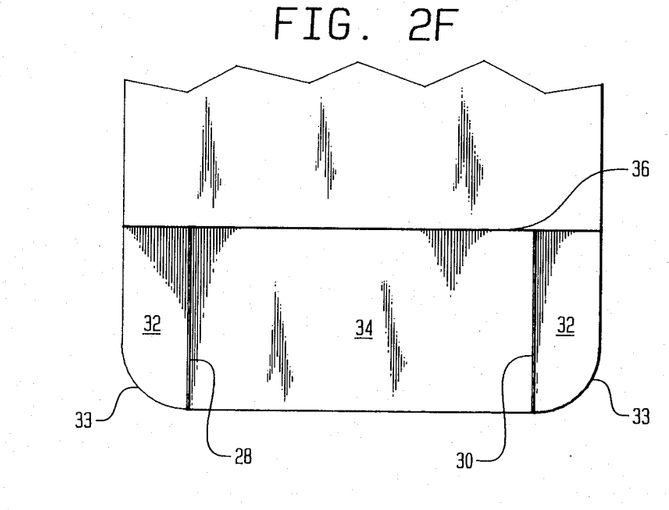
FIG. 2F is a partial top plan view of the preferred embodiment of FIG. 2A.
Figure 2G:
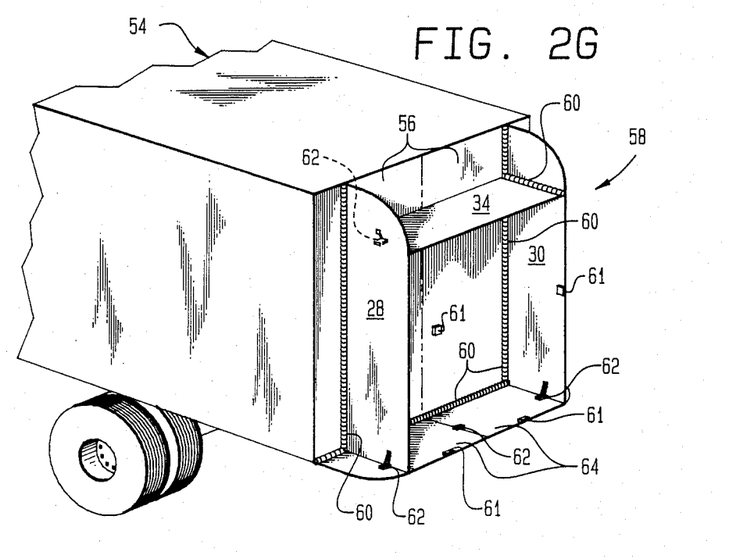
FIG. 2G is a perspective view of the preferred embodiment shown in FIG. 2A but modified so that it can be attached to a semi-trailer van having two flat rear swing doors.

FIG. 2E is a partial side elevational detail of the preferred embodiment 10 and FIG. 2F is a partial detail top plan view of the preferred embodiment 10. The vertical panels 28 and 30 shown in FIG. 2E have rounded edges 31. Similarly, as shown in FIG. 2F, the bottom panel 32 has a pair of rounded edges 33. Curved edges 31 and 33 are provided for aesthetic reasons and also to avoid sharp corners which may be easily bent if inadvertently impacted.

Figure 2H:
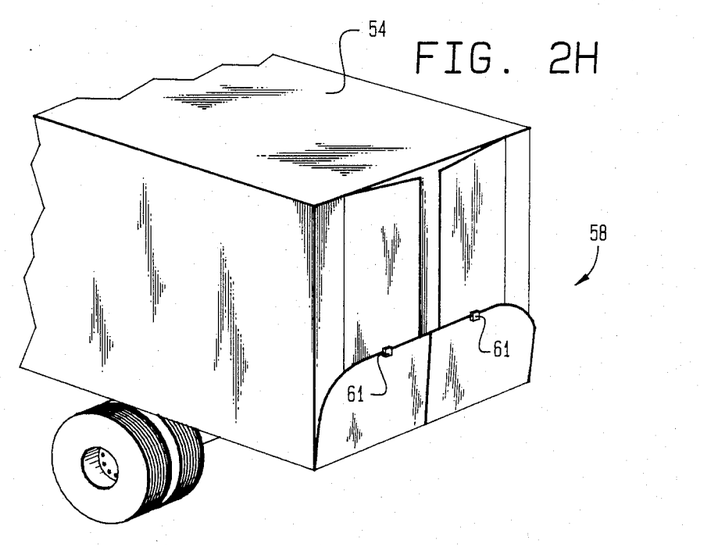
FIG. 2H is a perspective view of the modified version of the preferred embodiment shown in FIG. 2G illustrating the manner in which the two rear doors and the drag reducer can be collapsed and locked against the sides and rear of the semi-trailer van body.
Figure 2I:
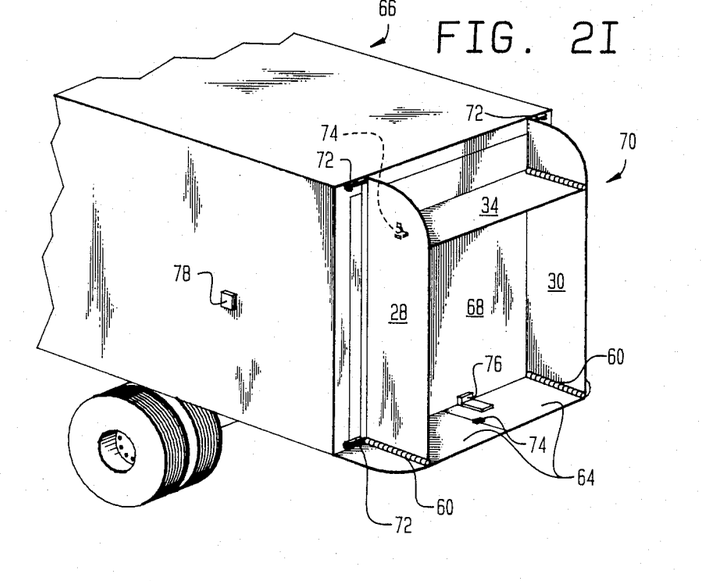
FIG. 2I is a perspective view of the preferred embodiment of FIG. 2A, but modified to fit on the back of a semi-trailer van having roll-up doors.

One of the major problems associated with prior art drag reducing attachments for the rear of blunt bodies is that the attachments may get in the way of the normal loading and unloading process of the van 12. Therefore it is important that the preferred embodiment 10 be adaptable to vans 12 having either a pair of flat rear swing opening doors or a roll up door. FIG. 2G illustrates a van 54 having a pair of flat rear doors 56 which open outwardly from the center line of the rear 26 of the body. The collapsible embodiment 58 of the invention includes a plurality of hinges 60 which allow panels 28, 30, 32 and 34 to fold up flat against the rear doors 56. Collapsible embodiment 58 is stored by releasing a latch 62 holding panel 34 to panel 28 and swinging top panel 34 downwardly to a vertical position against the other vertical panel 30. The bottom panel 32 is split into two sub panels 64. Another set of latches 62 hold one panel 64 to vertical panel 28 and another panel 64 to vertical panel 30. By releasing latches 62 it is possible to allow the vertical panels 28 and 30 to be swung inwardly against rear doors 56. Base sub-panels 64 are then swung upwardly and locked by latches 61 against rear doors 56. In this manner the entire preferred collapsible embodiment 58 is stowed flush against the rear doors 56 and will not interfere with the opening or closing of the rear doors 56. FIG. 2H illustrates the manner in which the collapsible embodiment 58 is folded substantially flat against the rear doors 56 so that the doors 56 may open fully and be flush against the sides 20 and 22 of the van body 12.

While many vans 12 have flat rear swing doors, a number of vans have doors which roll up vertically and stow ust under the roof 18 of the van. An alternative collapsible embodiment 70 is illustrated in FIG. 2I and shown attached to the end of a van 66 having roll up doors 68. In this embodiment the vertical panels 28 and 30 are attached to the rear 26 by pivot arms 72. Collapsible embodiment 70 is stored by unlatching latch 74 of top panel 34 from the left side vertical panel 28 and swinging top panel 34 down against the right side vertical panel 30. The bottom panel 32 is split into two sub panels 64. The sub panels 64 are latched to each other by latch 74 and to the rear of the truck by latches 76. In order to store base sub-panels 64, they are first unlatched from each other by releasing latch 74 and then released from the rear of the van by releasing latch 76. The base sub-panels 64 are then swung upwardly about their hinges up against vertical panels 28 and 30 respectively where they are locked in place. Lastly, vertical panels 28 and 30 are then swung around against the sides of the van 20 and 22 respectively where they are held in place by latches 78. Pivot arms 72 are important in that they provide the offset required to bring the panels 28 and 30 flush against the sides of the van 66. While pivot arms 72 are described in the context of vans 66 having roll up doors 68 it is clear that pivot arms 72 could also be used with vans 54 having folding doors 56 as previously desribed in FIGS. 2G and 2H.

Figure 3:
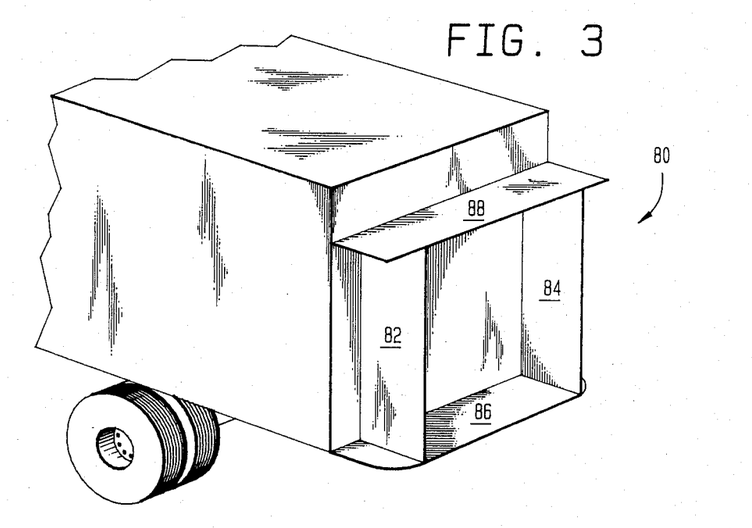
FIG. 3 is a perspective view of an alternative embodiment of the present invention.

The basic preferred embodiment 10 may be either rigidly mounted to a van 12 or mounted in a collapsible manner as illustrated by embodiments 58 and 70. However, there are variations on the basic embodiment which may also prove to be efficient in reducing the base drag of a vehicle 12. According to one alternative embodiment 80, illustrated in FIG. 3, two vertical side panels 82 and 84 extend from a bottom panel 86 part way up the rear of the van terminating in a horizontal panel 88 which extends the entire width of the van. Alternative embodiment 80 also traps three vortices like the preferred embodiment 10, but the horizontal vortex which turns the flow from the roof downward is longer in alternative embodiment 80 while the vertical vortices which turn the flow from the sides of the van inward are shorter in the alternative embodiment.

Figure 4:
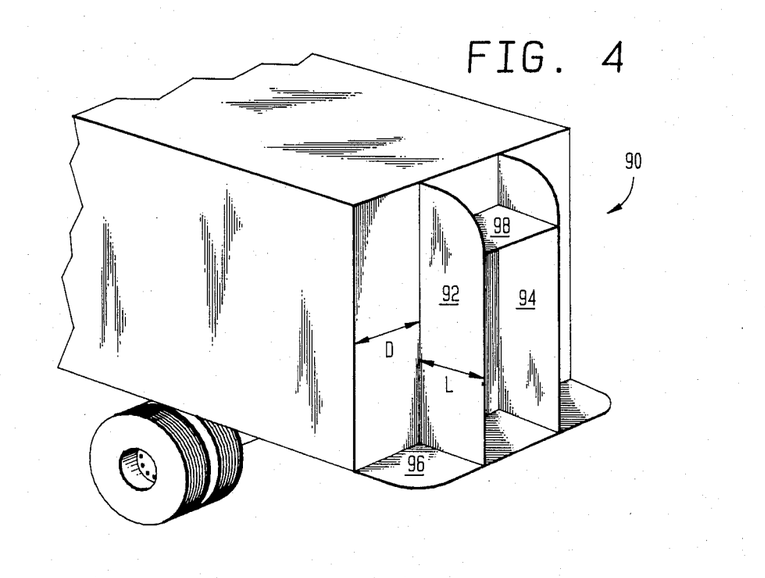
FIG. 4 is a perspective view of another alternative embodiment of the present invention.

Another alternative embodiment 90, illustrated in FIG. 4 includes a bottom panel 96, two vertical panels 92 and 94 extending the full height from the bottom to the top of the trailer and a top horizontal panel 98 extending between the two vertical panels 92 and 94. The difference between alternative embodiment 90 and the preferred embodiment 10 is that the distance D between the sides of the van and the panels 92 and 94 is larger than in the preferred embodiment. Therefore a pair of larger vertical vortices are captured and the effective base area of the van is further reduced over the preferred embodiment 10. However, in order to increase the distance D it is also necessary to increase the distance L by which the panels 92, 94, 96 and 98 extend rearwardly from the end of the van. Therefore, there is a trade off between the offset distance D and the extension distance L. Practical length restrictions may, therefore, preclude utilization of alternative embodiment 90. Moreover, due to the extended size of the panel a segmented, articulated stowage system would probably be required.

Figure 5:
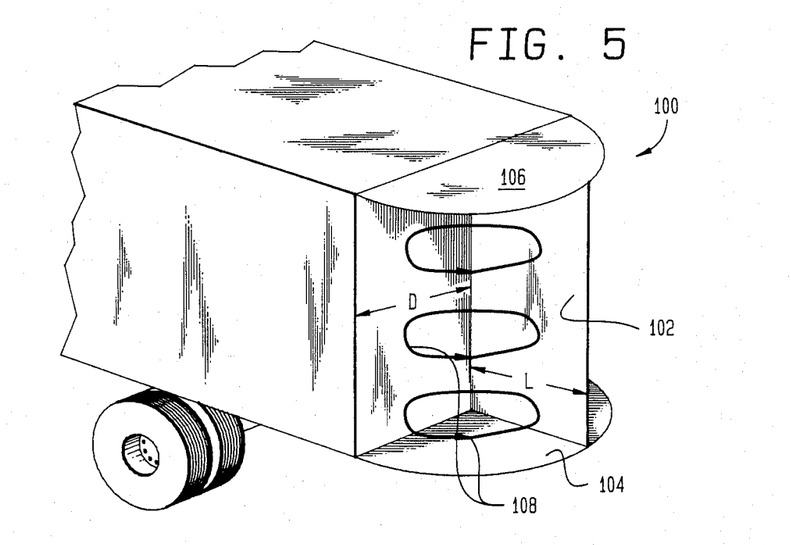
FIG. 5 is a perspective view of a limiting alternative embodiment of the present invention including the captured vortices.

FIG. 5 illustrates the limiting condition where the vertical panels 92 and 94 of alternative embodiment 90 or vertical panels 28 and 30 of the preferred embodiment 10 are moved together so that they merge at the center line of the van 12. Accordingly, the limiting embodiment 100 has a single vertical panel 102 located at the center line of the van and a bottom panel 104 and a top panel 106 which define the upper and lower limits of the vortex capturing apparatus. The single vertical panel extends a distance L behind the van. In order to be effective the trailing distance L must be one or more times D where $D = W/2$. The limiting alternative embodiment 100 has several drawbacks. First, it can only capture two vortices 108 and therefore is not effective in turning the flow downwardly from the roof or upwardly from the base of the van. Second, the length L is much longer than any of the other alternative embodiments. Third, due to the extreme dimension L it would probably be necessary to make the apparatus with multi-articulated joints in order to be able to fold it into a stored position.

Figure 6:
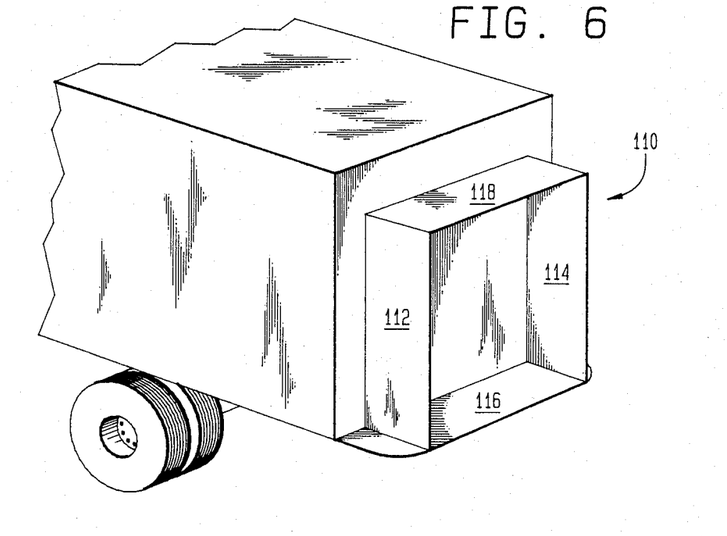
FIG. 6 is a perspective view of yet another embodiment of the present invention.

Another alternative embodiment 110 of the invention is illustrated in FIG. 6. Embodiment 110 includes a first and second vertical panel 112 and 114, a bottom panel 116 and a top panel 118. The difference between embodiment 110 and the previous embodiments is that neither the vertical panels 112 or 114 or the top horizontal panel 118 extend the rear height or width respectively of the rear of the van. Panels 112, 114, and 118 and van base 126 form a poorly defined cavity along the sides and roof of the van base. The base plate 116 isolates the cavity from the turbulence formed under the van.

Figure 7:
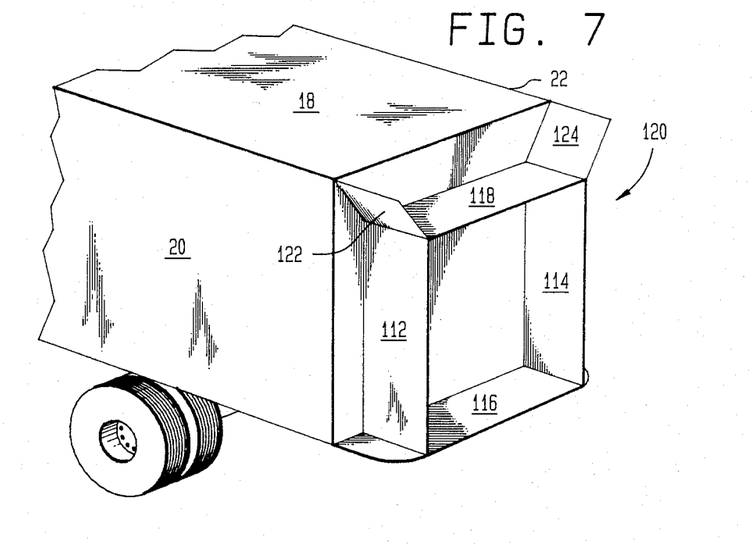
FIG. 7 is a perspective view of a modification of the altervative embodiment of the present invention illustrated in FIG. 6.

The efficiency of the embodiment 110 in FIG. 6 can be improved by adding two diagonal panels 122 and 124 as illustrated in FIG. 7. According to the improved embodiment 120 a first diagonal panel 122 extends from the intersection of vertical panel 112 and top horizontal panel 118 to the intersection of the corner between the left side 20 of the van 12 and the top 18. Similarly, the other diagonal panel 124 extends from the intersection of vertical panel 114 and top horizontal panel 118 to the intersection between the top of the roof 18 and the right side 22 of the van. Diagonal panels 122 and 124 help contain the vortex by breaking it into three, more or less, straight lengths.

Figure 8:
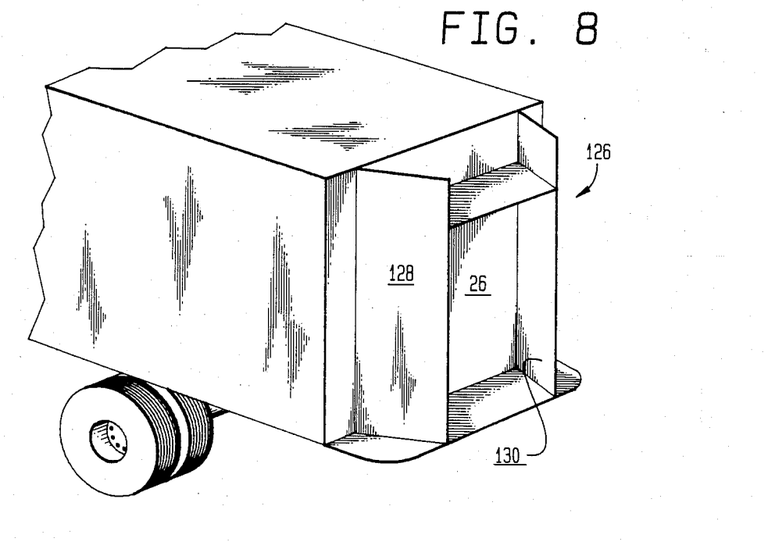
FIG. 8 is a perspective view of a variation of the preferred embodiment illustrated in FIG. 2A in which the vertical splitter panels are turned inwardly.

The embodiment 126 illustrated in FIG. 8 attempts to capture two vertical vortices and one horizontal vortex while utilizing the vertical panels to turn the airflow from the sides and roof of the van. The vertical panels 128 and 130 of embodiment 126 are flat but mounted at an angle other than perpendicular with respect to the rear 26 of the van.

Figure 9:
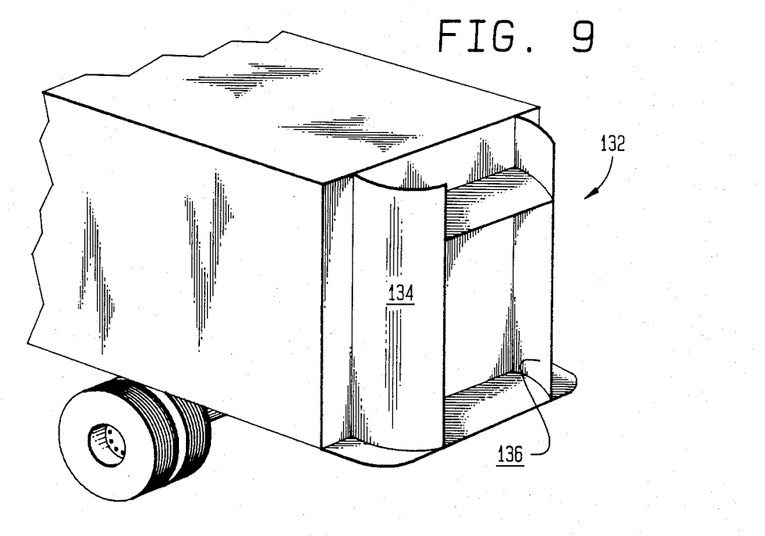
FIG. 9 is a perspective view of another modification of the preferred embodiment as illustrated in FIG. 2A in which the vertical splitter panels are curved inwardly.

A similar embodiment 132 employs a pair of curved vertical panels 134 and 136 to turn the flow from the sides and roof of the van. It is believed that curved panels 134 and 136 are probably more efficient in this context than the flat panels 128 and 130 such as illustrated in FIG. 8 for the purpose of turning the flow inwardly towards the rear of the van.

Figure 10:
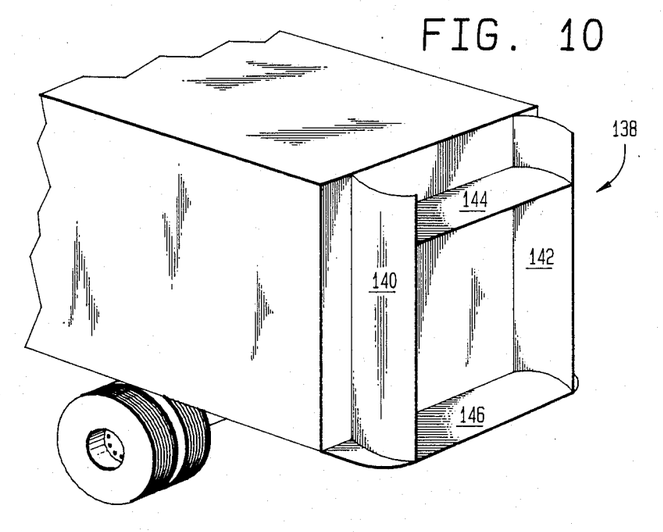
FIG. 10 is a perspective view of another modification of the preferred embodiment illustrated in FIG. 2A in which the vertical splitter panels and the top and bottom horizontal panels are all curved in order to direct flow.

Lastly, FIG. 10 illustrates an embodiment 138 in which the general structure is identical to that of the preferred embodiment except that the two vertical panels 140 and 142 and the top horizontal panel 144 and bottom horizontal panel 146 are all curved in order to assist in drawing the airflow around towards the rear of the van.

The preferred embodiment 10 attaches to the back of a semi-trailer or trailer van 12. Vans 12 such as shown in FIG. 2A have a nominal width W=96" and a typical height from the floor to the roof of the van H=114". The preferred embodiment 10 includes end plates 28 and 30 of width L=between 40" and 56" and mounted offset from the sides 20 and 22 and roof 18 of the van D=12" and G=17" respectively. The preferred embodiment 10 has the following nondimensional ratios:

D/W=0.13, G/H=0.15 and D/L=G/L=0.3

The above ratios are typical and preferred but may be adjusted to either improve the efficiency of capture of vortices or to move the panels 28 and 30 away from existing structural members on the van rear 26 which may interfere with installation. The preferred ranges of the ratios are:

0.1≦D/W≦0.2
0.1≦G/H≦0.2
0.2≦D/L=G/L≦0.4

Testing of the preferred embodiment has shown that with D/W=0.13, G/H=0.15, and D/L=G/L=0.3 a 10.2% reduction in the aerodynamic drag of a typical tractor semi-trailer van rig 12 has been achieved. This 10.2% reduction is based upon the van rig 12 without a vortex capturing device affixed to the back having a drag coefficient of 0.6.

While the invention has been described with reference to the preferred embodiment thereof it will be appreciated by those of ordinary skill in the art that changes can be made to the structure and materials of the invention without departing from the spirit and scope thereof.

I claim:

1. An apparatus for reducing drag at the trailing end of a blunt body having a front end, a trailing end, a top surface, and a first and a second sidewall surface, said apparatus comprising:
    first vortex capturing means connected to said trailing end for capturing and stabilizing a first vortex having an axis substantially parallel to the plane of said first sidewall surface, said first vortex capturing means including a first panel means attached to said trailing end and having a long axis substantially parallel to the plane of said first sidewall surface;
    second vortex capturing means attached to said trailing end for capturing a second vortex having an axis substantially parallel to the plane of said second sidewall surface, said second vortex capturing means including a second panel means attached to said trailing end and having a long axis substantially parallel to the plane of said second sidewall surface;
    third vortex capturing means connected to said trailing end for capturing a third vortex having an axis substantially parallel to the plane of said top surface, said third vortex capturing means including a third panel means attached to said trailing end and having a long axis substantially parallel to the plane of said top surface; and,
    fourth panel means attached to the lower portion of said trailing end and having a long dimension substantially parallel to the plane of said top surface, said fourth panel means defining one end of said first and second vortex capturing means.

2. The apparatus of claim 1 wherein said first and second sidewall surfaces have a vertical height H and said first panel means and said second panel means are respectively located a distance D from the trailing edge of said first and second sidewall surfaces respectively so that the ratio D/H is less than 1.

3. The apparatus of claim 1 further including:
    hinge means for connecting said first and second panel means to said trailing end and for permitting said first and second panel means to fold up substantially flat against said blunt body when not in use.

4. The apparatus of claim 3 further including:
    first locking means for locking said first and second panel means in its operating position so that it can capture said first and second vortices.

5. The apparatus of claim 4 further including:
    second locking means for locking said first and second panel means substantially flat against said blunt body when not in use.

6. The apparatus of claim 1 wherein said first and second panel means are curved in order to encourage the flow of air inwardly after it passes over the sides of said blunt body.

7. The apparatus of claim 1 wherein said third panel is curved in order to encourage air inwardly after it passes over the top of said blunt body.

8. The apparatus of claim 1 wherein said first and third panel means intersect at a first intersection line and said second and third panel means intersect at a second intersection line, said apparatus further including:
    fifth panel means extending from said first intersection line to the extended intersection line between said top surface and said first sidewall surface; and,
    sixth panel means extending from said second intersection line to the extended intersection line between said top surface and said second sidewall surface.

9. An apparatus for reducing drag at the trailing end of a blunt body having a front end, a trailing end, a top surface, and a first and a second sidewall surface, said appartus comprising:
    first vortex capturing means connected to said trailing end for capturing and stabilizing a first vortex having an axis substantially parallel to the plane of said first sidewall surface, said first vortex capturing means including a first panel means attached to said trailing end and having a long axis substantially parallel to the plane of said first sidewall surface, said first panel means extending substantially the entire vertical height of said first sidewall surface;
    second vortex capturing means attached to said trailing end for capturing a second vortex having an axis substantially parallel to the plane of said second sidewall surface, said second vortex capturing means including a second panel means attached to said trailing end and having a long axis substantially parallel to the plane of said second sidewall surface, said second panel means extending substantially the entire vertical height of said second sidewall surface; and, third vortex capturing means connected to said trailing end for capturing a third vortex having an axis substantially parallel to the plane of said top surface, said third vortex capturing means including a third panel means attached to said trailing end and having a long axis substantially parallel to the plane of said top surface, said third panel means extending substantially the distance separating said first and second panel means.

10. An apparatus for reducing drag at the trailing end of a blunt body having a front end, a trailing end, a top surface, a bottom surface, a first sidewall surface and a second sidewall surface, said apparatus comprising:

a first vertical panel lying in a plane parallel to said sidewalls and attached to said trailing end at a point intermediate said sidewalls;

a first horizontal panel lying in a plane perpendicular to said sidewalss and attached to said trailing end so that said first vertical panel substantially contacts said first horizontal panel;

first vertical hinge means for attaching said first vertical panel to said trailing end; and, first horizontal hinge means for attaching said first horizontal panel to said trailing end, wherein said first vertical hinge means and said second horizontal hinge means permit said first vertical panel and said first horizontal panel respectively to be folded substantially flat against said blunt body when said panels are not deployed for reducing drag.

11. The apparatus of claim 10 further comprising:

a second vertical panel lying in a plane parallel to said sidewalls and attached to said trailing end so that it contacts said first horizontal panel.

12. The apparatus of claim 11 further comprising:

a second vertical hinge means for attaching said second vertical panel to said trailing end so that said second vertical panel can be folded subsantially flat against said blunt body when said second vertical panel is not deployed to reduce drag.

13. An apparatus for reducing drag at the trailing end of a blunt body having a front end, a trailing end, a top surface, a bottom surface, a first sidewall surface and a second sidewall surface, said apparatus comprising:

a first vertical panel lying in a plane parallel to said sidewalls and attached to said trailing end at a point intermediate said sidewalls;

a first horizontal panel lying in a plane perpendicular to said sidewalls and attached to said trailing end so that said first vertical panel substantially contacts said first horizontal panel; and, a second horizontal panel lying in a plane substantially parallel to the plane of said first horizontal panel and connected to said first vertical panel at a location separated from the point of contact of said first horizontal panel to said first vertical panel.

14. An apparatus for reducing drag at the trailing end of a blunt body having a front end, a trailing end, a top surface, a bottom surface, a first sidewall surface and a second sidewall surface, said apparatus comprising:

a first vertical panel lying in a plane parallel to said sidewalls and positioned adjacent said trailing end at a location intermediate said sidewalls;

a first horizontal panel lying in a plane perpendicular to said sidewalls and positioned adjacent to said trailing end so that the plane of said first vertical panel intersects the plane of said first horizontal panel; and, a second vertical panel lying in a plane parallel to said sidewalls and positioned adjacent to said trailing end so that the plane of said second vertical panel intersects the plane of said first horizontal panel.

15. An apparatus for reducing drag at the trailing end of a blunt body having a front end, a trailing end, a top surface, a bottom surface, a first sidewall surface and a second sidewall surface, said apparatus comprising:

a first vertical panel means for lying in a plane parallel to said sidewalls and positionable adjacent to said trailing end at a location intermediate said sidewalls when deployed for use;

a first horizontal panel means for lying in a plane perpendicular to said sidewalls and positionable adjacent to said trailing end so that the plane of said first vertical panel intersects the plane of said first horizontal panel when deployed for use; and, panel folding means for attaching said first vertical panel means and said first horizontal panel means to said blunt body, wherein said panel folding means permits said first vertical panel means and said first horizontal panel means respectively to be folded substantially flat against said blunt body when said panel means are not deployed for reducing drag.

16. An apparatus for reducing drag at the trailing end of a blunt body having a front end, a trailing end, a top surface, a bottom surface, a first sidewall surface and a second sidewall surface, said apparatus comprising:

first vertical panel means for capturing a first vortex lying in a plane parallel to said sidewalls and positionable adjacent to said trailing end at a first location intermediate said sidewalls when deployed to reduce drag; and, a second vertical panel means for capturing a second vortex lying in a plane parallel to said sidewalls and positionable adjacent to said trailing end at a second location different from said first location and intermediate said sidewalls when said second panel means is deployed to reduce drag wherein said first and second vortices cause the flow of air to flow around the first and second sidewall surfaces towards the center line of said blunt body.

* * * * *